United States Patent

[11] 3,610,829

[72] Inventors Hans Dinkel Grobenzell; Anton Muschik, Munich; Adolf Haass, Munich, all of Germany
[21] Appl. No. 649,573
[22] Filed June 28, 1967
[45] Patented Oct. 5, 1971
[73] Assignee Siemens Aktiengesellschaft Berlin and Munich, Germany
[32] Priority June 29, 1966
[33] Germany
[31] S 104503

[54] TRANSMISSION OF PULSE-CODED INFORMATION OVER TELEPHONE LINES
7 Claims, 3 Drawing Figs.

[52] U.S. Cl. .......... 179/2 DP, 178/66, 178/53
[51] Int. Cl. .......... H04m 11/06
[50] Field of Search .......... 179/4, 2 DP, 3, 84 VF, 2, 4, 89 VF; 178/66, 53

[56] References Cited
UNITED STATES PATENTS

| | | | |
|---|---|---|---|
| 3,436,487 | 4/1969 | Blane .......... | 179/84 |
| 2,364,685 | 12/1944 | Baker .......... | 179/84 |
| 2,352,918 | 7/1944 | Smith .......... | 179/4 |
| 3,226,480 | 12/1965 | Wright .......... | 179/15 |

*Primary Examiner*—Kathleen H. Claffy
*Assistant Examiner*—Tom D'Amico
*Attorney*—Birch, Swindler, McKie & Beckett

ABSTRACT: A circuit arrangement associated with subscriber stations connected between telephone lines, wherein a portion of the frequency range normally utilized for voice telephone communication is used to transmit a plurality of pulse-coded messages and associated control signals. Means are connected to each subscriber station to block the frequency range employed for transmission of voice telephone communication. A generator associated with each subscriber station may selectively generate signals at different carrier frequencies for pulse modulation by the message and control signals, and a receiver associated with each subscriber station selectively demodulates received modulated signals. A transfer control system is provided to control the frequency of the carrier signal generated by the generator and to effect selective connections between subscriber stations such that they may be utilized for pulse-coded message transmission and control signal reception, or for pulse-coded message reception and control signal transmission. Further, the carrier signals normally utilized to transmit control signals, may also be modulated to form pulse-coded information bits, thereby providing an additional message channel between subscriber stations.

TRANSMISSION OF PULSE-CODED INFORMATION OVER TELEPHONE LINES

CROSS REFERENCE TO RELATED APPLICATION

Applicant claims priority from German application No. S104,503, filed June 29, 1966, in Germany.

BACKGROUND OF THE INVENTION

1. Field of the Invention

The invention relates to pulse-coded message transmission over telephone lines between subscriber stations wherein a portion of the frequency range normally used for voice telephone communication is employed for the transmission of pulse-coded messages. The pulse-coded messages may be derived from teletype machines or other similar devices.

2. Description of the Prior Art

The prior art teaches the transmission of pulse-coded information over telephone lines. Such information, for example, may comprise telegraph signals or other similar data.

One method employed comprises subposing or using a separate frequency range for transmission of the pulse-coded messages that is below the lowest frequency used for voice telephone communication. This frequency is conventionally accepted to be 300 cps. However, the available frequency range below 300 cps. is limited and therefore only one transmission and one reception channel, each approximately 125 c.p.s. in bandwidth, may be employed for the transmission of pulse-coded messages. This narrow bandwidth produces a correspondingly low rate of information transmission, and is therefore inadequate. Further, the subposing technique is possible only when the telephone communication lines comprise wires.

Another prior art technique comprises superposing a separate frequency range above the upper range of the voice telephone communication range for the transmission of pulse-coded messages between subscriber stations. Normally, said separate frequency range is above 2,700 c.p.s. and provides one transmission and one reception channel. It has disadvantages similar to those discussed in relation to the subposing technique because only approximately 150 c.p.s. bandwidth is available for each channel. If greater channel bandwidths are employed, the quality of telephone communication appreciably decreases because the high frequencies are essential to good transmission of the consonants in voice telephone communication. Further, the superposing technique has an additional disadvantage, compared to the subposing technique, in that it cannot be used when the telephone transmission lines are heavily loaded.

Still another prior art method comprises interposing within the voice telephone communication frequency band, a transmission channel and a receiving channel for pulse-coded information. This technique has the advantage that the upper frequency range that is important for proper recognition of consonants, and the lower frequency range that is important for the individual speaker's tone color, in voice telephone communication, is not reduced. The interposing technique provides transmission and reception channels substantially wider than that described in relation to the subposing and superposing methods, but which are still considered insufficient for modern data transmission.

SUMMARY OF THE INVENTION

These and other defects and objections of prior art devices and methods used to transmit pulse-coded messages over telephone lines, are solved by the present invention which provides relatively wide bandwidth transmission and receiving channels for such use by subscriber stations connected to said telephone lines. Thus, the rate of information transmission of pulse-coded messages is maximized.

More particularly, the invention provided for the utilization of a relatively large portion of the frequency range normally associated with voice telephone communication, for the transmission of pulse-coded messages and associated control signals between connected subscriber stations. The invention utilizes practically the entire frequency range interposed in the speaking band normally reserved for voice telephone communication, for the transmission of said pulse-coded messages, and thus provides a higher rate of information transmission relative to prior art devices.

It has been found that the frequency range between approximately 1,000 to 1,500 c.p.s. may be utilized for the transmission of pulse-coded messages and control signals between subscriber stations without substantially affecting the quality of voice telephone communication. Thus, the higher frequencies that are important for good quality consonant transmission, and the lower frequencies that are important for the speaker's tone color, in voice telephone communication, are retained for use in voice telephone communication. Further, a relatively large number of carrier frequencies are available within this range compared to prior art devices, thereby maximizing the rate of information transmission over the common telephone communication line that may be used by a plurality of connected subscriber stations.

The portion of frequency range 1,000–1,500 c.p.s. used for pulse-coded message transmission according to the invention, is substantially greater than that used for control signal transmission. The transmitted control signals and associated circuits may be used to complete connections between apparatus such as teletype machines associated with each subscriber station and to alternate the direction of pulse-coded message transmission between connected subscriber stations. A plurality of subscriber stations are provided, connectable over a common telephone communication line through a teletype exchange. In rest condition, each subscriber station generates a characteristic signal frequency within the pulse-coded message transmission range, and may receive signals within said range, or within the control signal transmission range. By activation of a call key at a subscriber station, a characteristic frequency associated therewith may be transmitted to another subscriber station, to operatively connect teletype machines or similar type apparatus therebetween over the common telephone communication line.

Information transmission between connected subscriber stations can be exchanged simultaneously, by using both the pulse-coded message transmission channel and the control signal transmission channel to transmit information therebetween. The invention also provides for supervisory apparatus to indicate whether or not the connection between subscriber stations is complete.

DETAILED DESCRIPTION OF THE INVENTION

Figure 1:
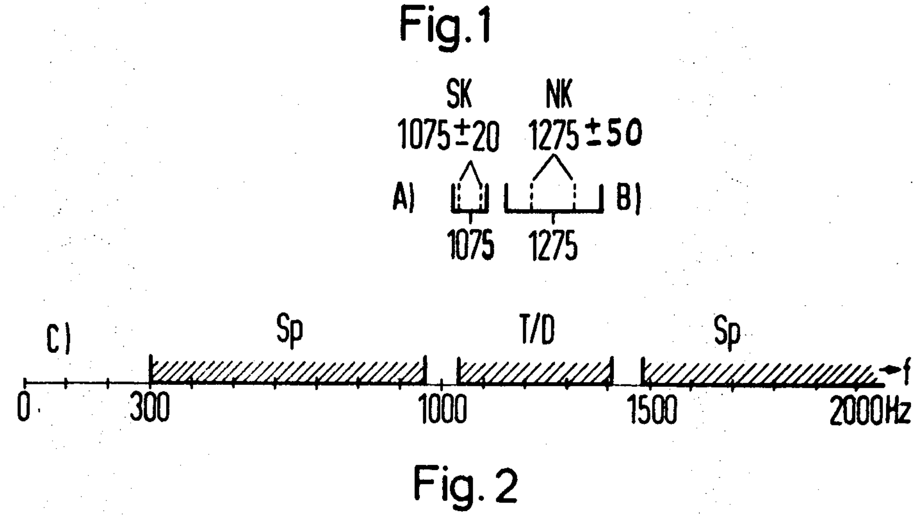
FIG. 1 shows graphs A, B, and C, which indicate the transmission range that may be utilized for pulse-coded message transmission, and illustrative carrier frequencies that may be employed by a subscriber station.

FIG. 1 illustrates a portion of the voice frequency range between 0 and approximately 2,000 cps. In voice telephone communication, the frequency range between 300 and 3,000 c.p.s. is of particular interest because this is the range normally used to transmit voice messages over telephone lines.

According to this invention, a portion of the 300 to 3,000 c.p.s. frequency range is used to transmit a plurality of pulse-coded messages and associated control signals over a common telephone line connected between a plurality of subscriber stations. For example, said pulse-coded messages may comprise telegraph signals or various types of data information transmitted in bit form. With reference to FIG. 1, it is seen that the frequency range T/D between approximately 1,000 to 1,500 c.p.s. is used to transmit the pulse-coded messages and control signals. The control signals function to effect the desired connections between subscriber stations.

It has been found that elimination of the frequency range between approximately 1,000 through 1,500 c.p.s. does not appreciably detract from the quality of voice telephone communication; thus, consonant clarity and the speaker's tone color are not substantially affected. Therefore, this range may be employed to transmit pulse-coded information and control signals associated therewith between subscriber stations, without adversely affecting the quality of voice telephone communication.

Figure 2:
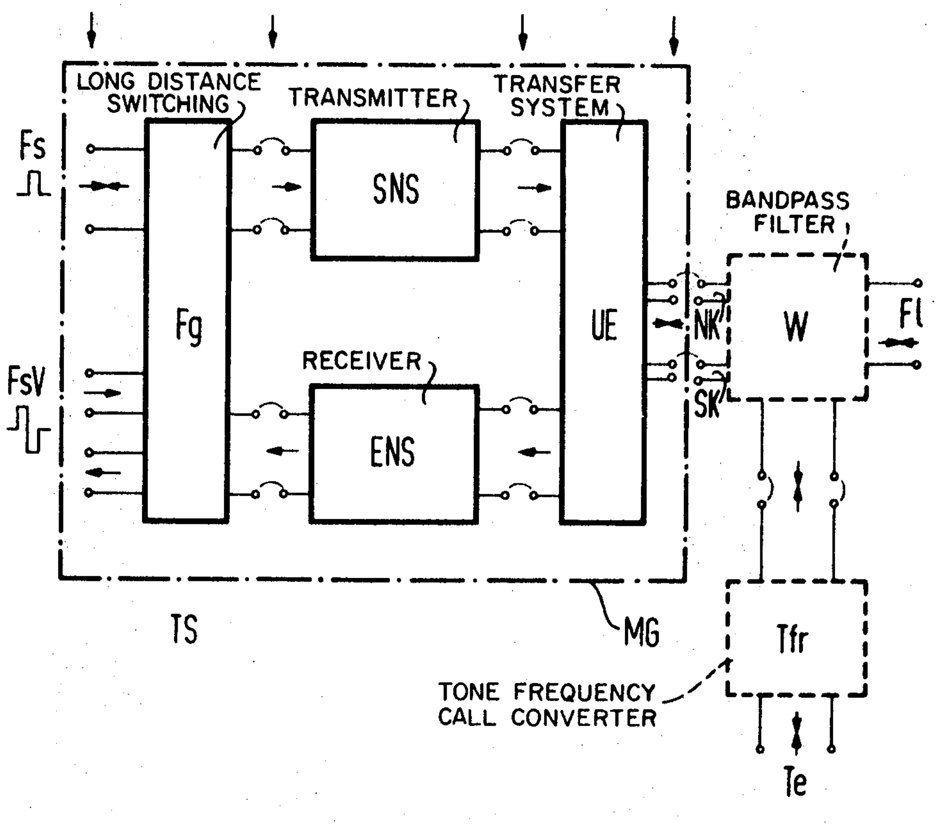
FIG. 2 is an electrical schematic diagram of a subscriber station according to the teachings of this invention.

FIG. 2 shows a subscriber station TS that comprises a modulation device MG. Long distance switching apparatus *Fg* comprises terminals *Fs* that are connected to a teletype machine (not shown) and four wire connection *Fs*V that is connected to the teletype machine exchange. An output of long distance switching apparatus *Fg* is connected to transmitter SNS, and receiver ENS is connected to an input thereof. Thus, long distance switching apparatus *Fg* may selectively transmit information from the teletype machine exchange *Fs*V to transmitter SNS, or from receiver ENS to the teletype machine *Fs*. The teletype machine exchange *Fs*V determines the particular subscriber stations to be interconnected for the exchange of information therebetween.

Transfer system UE is connected to transmitter SNS and receiver ENS to selectively provide transmission paths therebetween to filter W and long distance line F1, over pulse-coded message channel NK, and control signal channel SK. Thus transfer system UE determines what channels (NK or SK) connect transmitter SNS and receiver ENS to long distance line F1.

The telephone connection T*e* is connected to filter W through tone frequency call converter Tfr. Filter W comprises a band pass filter that blocks the frequency range T/D reserved for the transmission of pulse-coded messages and control signals from the telephone connection T*e*. Frequency range T/D is approximately 1,000 through 1,500 cps.

It is therefore seen that the subscriber station TS may transmit or receive pulse-coded messages such as teletype transmissions over long distance telephone line F1.

Figure 3:
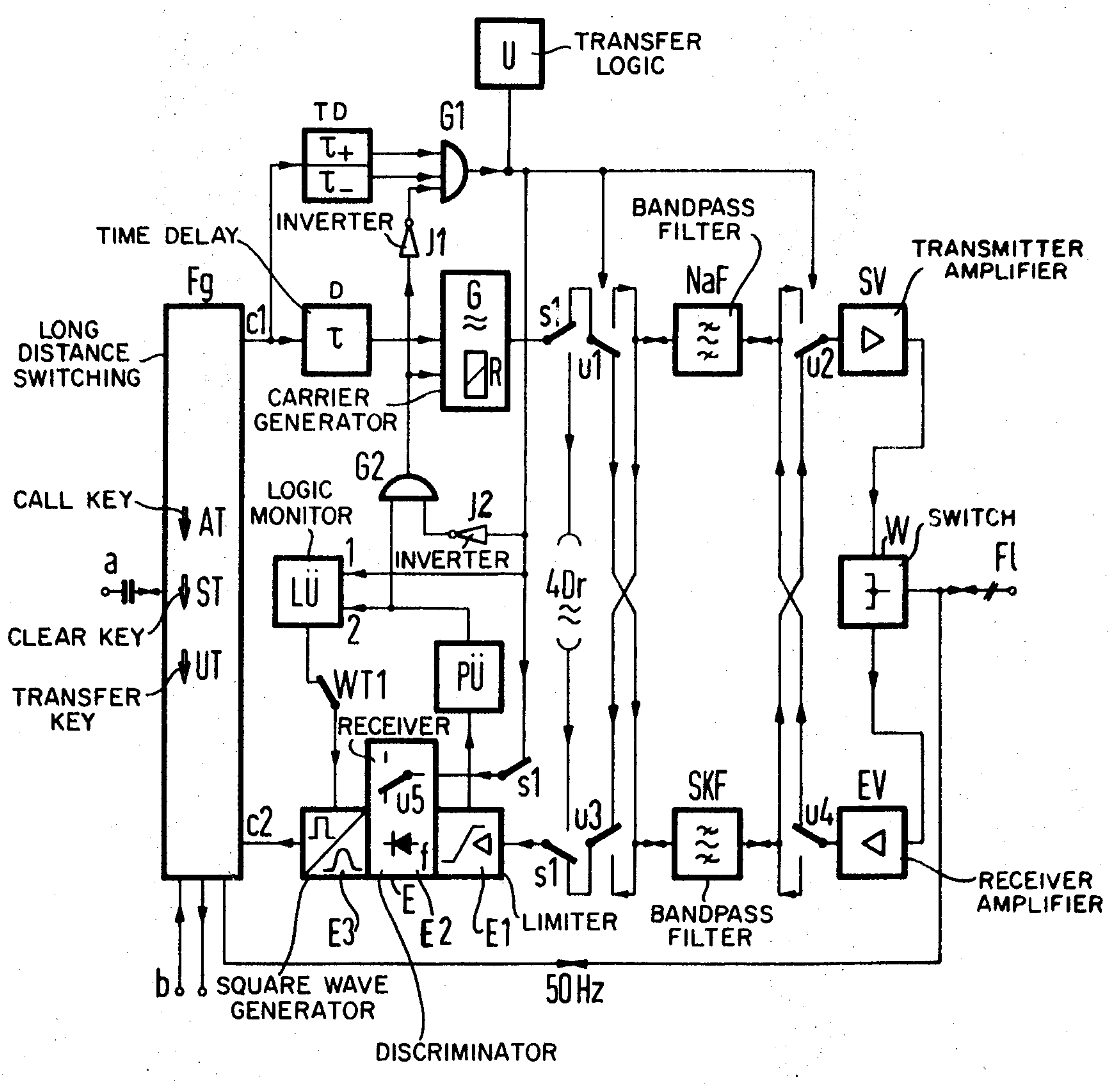
FIG. 3 is an electrical schematic diagram of the subscriber station illustrated in FIG. 2, which illustrates the invention in greater detail.

FIG. 3 illustrates the modulation apparatus MG discussed in relation to FIG. 2 in greater detail. Thus, long distance switching apparatus *Fg* comprises call key AT, clear key ST, and operation transfer key UT. The particular functions of these keys will be explained hereinafter.

Input *a* comprises the connection between long distance switching apparatus *Fg* and the teletype machine, and input *b* comprises the connection between long distance switching apparatus *Fg* and the teletype exchange. An output of switching apparatus *Fg* is connected over connection line *c*1 and time delay network D to generator G. Thus the pulses emitted by operation of the teletype machine modulate the output of generator G, which effectively comprises the transmitter. Receiver E is connected to an input of switching apparatus *Fg* over connection line *c*2.

Generator G comprises means to generate carrier signals for the pulses produced by the teletype machine and for the control signals in accordance with the setting or condition of relay R as determined by the output of supervisory device PU. Further, a lower and an upper carrier signal frequency is associated with both message and control signal transmission, and generator G selectively generates the desired upper or lower carrier signal frequencies depending upon the polarity of the signal input applied thereto over time delay network D.

For illustrative purposes, it may be assumed that the carrier frequency signal produced by generator G for pulse-coded message transmission (NK) is 1,225 or 1,325 c.p.s. depending upon the polarity of input *c*1 to generator G. The carrier frequency signal produced by generator G for control signal transmission (SK) is 1,055 or 1,095 c.p.s. depending upon the polarity of input *c*1 to generator G. This is illustrated in FIG. 1, which indicates the mean carrier frequencies for pulse-coded message and control signal transmissions are 1,075 and 1,275 cps., respectively. Negative polarity input signals at *c* 1 produce the upper carrier frequencies, and positive polarity input signals produce the lower carrier frequencies.

Receiver E comprises limiter amplifier E1, discriminator E2, and square wave generator E3 to shape the demodulated pulses to derive a square wave therefrom, for transmission to the teletype machine.

Time delay network D is connected in connection line *c*1 between long distance switching apparatus *Fg* and generator G, to delay electrical pulses or information bits emitted by the teletype machine, that pulse modulate the carrier signal generated by generator G to form the pulse-coded message. It comprises an electronic delay circuit, operative in the range of from 0 to 300 B*d*, and is independent of the telegraphing speed. Condition responsive means TD comprises time elements *t*+ and *t*−. Time element *t*+ always produces a positive output, except when a positive input signal of time duration greater than approximately 500 ms. is applied thereto. Then, it produces a negative polarity output signal. Further, the transition between a positive input signal and a negative input signal thereto produces a positive output signal therefrom.

Time element *t*− functions such that it produces a negative output when a negative input signal approximately equal in time duration to one second is applied thereto. A positive input signal, or a negative input signal of time duration less than one second, functions to produce a positive output signal at time element *t*−.

It is seen that AND gate G1 comprises three inputs, and is controlled by the outputs of time elements *t*+ and *t*−, and by the output from AND gate G2, through inverter 11. All inputs to AND gate G1 must be positive (binary 1) in order that AND gate G1 may produce a positive output (binary 1). If any or all of the inputs to AND gate G1 are negative (binary 0) the output therefrom will be negative (binary 0). Similarly, all inputs to AND gate G2 must be positive (binary 1) in order that it may produce a positive (binary 1) output.

Transfer logic circuit U is connected to gate G1 and comprises contacts *u*1 to *u*5. Of course, these contacts are symbolic of a switching mechanism that may comprise transistors or other such electronic switching elements, relays, etc. Transfer logic circuit U affects operational transfer of modulation apparatus MG from pulse-coded message reception to control signal reception, of from pulse-coded message transmission to control signal transmission and vice versa depending upon the logic control signal applied to transfer logic device U. Its associated contact *u*5 determines the frequency of the signal demodulated by discriminator E2. It is seen that the transfer logic device U comprising selectively actuable contacts *u*1 through *u*5 is controlled by time elements *t*+ and *t*− and AND gate G2, because they determine the output of AND gate G1. This particular logic circuit functions such that an erroneous operational transfer of the modulation apparatus MG is precluded.

Supervisory device PU is connected to limiter amplifier E1 of receiver E and is responsive to and evaluates the received signals. It produces a positive output signal when it is in the rest condition and a characteristic signal is transmitted thereto by another subscriber station to initiate teletype machine operation therebetween as explained hereinafter. Logic supervisory device LU functions to produce a negative output (binary 0) only if input 1 is positive (binary 1) and input 2 is negative (binary 0). Under all other conditions, logic supervisory device LU produces a positive polarity signal (binary 1). Thus when supervisory device PU produces a binary 1 output, indicating the reception of a signal be receiver E, logic supervisory device LU will also produce a binary 1 output.

Further, when supervisory device PU produces a binary 1 output, and AND gate G1 produces a binary 0 output, AND gate G2 will produce a binary 1 output because the output of AND gate G1 (binary 0) is inverted by inverter 12. A binary 1 output at AND gate G2 activates relay R and controls generator G to produce signals in the control signal carrier frequency range.

It is seen that long distance line F1 is connected through filter W, to receiver amplifier EV, and transmitter amplifier SV. The amplifiers SV and EV thus provide a termination of fixed resistance for long distance line F1.

Filter SKF comprises a band pass filter to pass the control signals and block the pulse-coded message signals, Filter NaF comprises a band-pass filter to pass the pulse-coded messages and block the control signals. Filters SKF and N*a* F are bidirectionally operative and provide a pulse-coded message channel and a control signal channel associated with the modulation apparatus MG.

REST CONDITION

The circuit illustrated in FIG. 3 functions in the following manner. In the rest condition where no connection exists between subscriber stations associated with the teletype exchange, no current pulses are applied to inputs *a* and *b* of long distance switching apparatus F*g*, and connection points *c*1 and *c*2 are negatively polarized. Further, subscriber stations that are in the rest condition, transmit no alternating current signals to long distance line F1. Generator G oscillates at the lower carrier frequency associated with pulse-code message transmission (NK1), and transfer contacts *u*1 through *u*5 of the transfer logic circuit U are actuated such that receivers E of subscriber stations in the rest condition are operative to receive and demodulate pulse-coded messages in the pulse-code message transmission range through filter N*a*K, and generator G is connected to the control signal channel comprising SKF. (See FIG. 3).

CONNECTING SUBSCRIBER STATIONS

Upon activation of call key AT at a subscriber station initially in the rest condition (the calling station), a positive potential signal is applied to connection line *c*1, for a time duration equal to at least 500 ms. Under these conditions, as explained heretofore, time element *t*-produces a positive potential signal at its output. Further, the positive polarity signal present at connection line *c*1 is fed through time delay network D to generator G which changes the frequency of oscillation thereof to the upper carrier frequency (NK*u*) associated with pulse-code message transmission.

Under these conditions, it is seen that the inputs to gate G1 are all positive (binary 1). Thus the output of time element *t* + is positive (binary 1). Also the output of AND gate G2 is negative (binary 0) because the output of supervisory device PU is negative (no signal being received by receiver E), and this is inverted by inverter 11 to produce a binary 1 input to AND gate G1. Thus AND gate G1 produces a binary 1 output.

A binary 1 output at gate G1 functions to switch the transfer logic circuit U such that contacts *u*1 through *u*5 are connected to complete the connection between generator G to long distance line F1 through S1, *u*1, NaF, *u*2, and SV, and W.

At the called station (as determined by conventional equipment associated with the teletype exchange and which is still in the rest condition) the output of generator G of the calling station, NK*u*, is fed from long distance line F1, through filter W, receiver amplifier EV, contact *u*4, filter NaF, contact *u*3, and switch S1, to receiver E. The reception of this signal by receiver E functions to activate supervisory device PU, which then produces a binary 1 output. Because gate G1 at the called station is producing a binary 0 output, that is inverted by inverter I2, it is seen that both inputs to AND gate G2 will comprise binary 1, and therefore AND gate G2 will produce a binary 1 output signal. This functions to activate relay R associated with generator G, which changes the oscillating frequency of the generator to the carrier frequency range associated with the control signals. Therefore, the called subscriber station may now transmit only control signals, and is set for pulse-coded message reception.

Further, a positive polarity signal is applied to connection line *c*2 by the initial signal output of discriminator E2 of receiver E of the called station, because the received signal is demodulated thereby. In the rest condition, connection line *c*2 was negatively polarized. The positive polarity pulse at connection line *c*2 functions to activate the motor of the teletype machine through relay means (not shown) associated with long distance switching apparatus F*g*. After the long distance switching apparatus F*g* of the called station connects the teletype machine thereof for operation, it produces a positive potential signal at connection line *c*1 which causes generator G to generate the upper carrier frequency SK*u* associated with control signal transmission. Because gate G2 produces a binary 1 output, which is inverted by inverter 12, AND gate G1 produces a binary 0 output, and maintains the transfer logic circuit U in the rest condition (as illustrated by the connection of contacts *u*1 through *u*5 illustrated in FIG. 3). Thus, at the called station, generator G is connected to long distance line F1 through the control signal channel comprising contact *u*1, filter SKF, contact *u*2, transmitter amplifier SV, and filter W.

The output signal of generator G at the called station, that is at the upper carrier frequency SK*u* associated with control signal transmission, is thus fed to the calling station over long distance line F1. At the calling station it is fed to receiver E, through switch W, receiver amplifier EV, contact *u*4, filter SKF, and contact *u*3. A positive polarity signal is produced by discriminator E2 of receiver E of the calling station at connection line *c*2 in response to the received signal to activate the teletype machine motor through long distance switching apparatus F*g* and connect it for operation. After the teletype machine at the calling station has thus been connected, a permanent positive polarity potential is applied to connection line *c*1 through long distance switching apparatus F*g*. This completes the connection between subscriber stations, and the teletype operation therebetween may then commence.

TELETYPE OPERATION

For illustrative purposes, assume that after the above-described connection has been effected between subscriber stations, activation of a teletype key associated with the calling subscriber station produces a negative starting pulse of time duration less than one second that is applied to connection line *c*1. Therefore, time element *t*— produces a positive output signal and AND gate G1 produces a binary 1 output. This enables electronic transfer circuit U to transmit a pulse-coded message over long distance transmission line F1 to the other connected subscriber station.

Generator G initially continues to produce a signal at its upper carrier signal frequency NK*u*, that functions as an information bit separation frequency at the transmitting subscriber station, until the negative starting pulse applied to connection line *c*1 is transmitted thereto through time delay device D (approximately 10 ms. time delay). Then generator G is rescanned to generate the lower carrier frequency signal NK1 for the duration of the applied negative signal to connection line *c*1 and is thus modulated thereby. The individual teletype keys produce characteristic signal pulses or trains of signal pulses and the successive signal pulses produced by the teletype machine determine the corresponding output of generator G that is transmitted to the receiver subscriber substations.

The activation of each teletype machine key produces pulse output signals from generator G of predetermined carrier frequency and width, that may be referred to as an information bit. When the teletype key is deactivated in the example given above, generator G will be rescanned to generate separation frequency signal NK*u*. This will be transmitted, provided the pause or time duration between activation of teletype keys is of insufficient time duration to cause time element *t*+ to produce a negative polarity output signal, that would cause AND gate G1 to produce a binary 0 output and break the established message transmission path.

However, if a typing pause greater than 500 ms. occurs, time element *t*+ commutates and produces a negative polarity signal at its output, thereby causing AND gate G1 to produce a binary 0 output. As explained heretofore, this functions to cause logic transfer circuit U to switch contacts *u*1–*u*5 to the pulse-coded message receiving condition, thereby terminating transmission. The connection line c1 of the subscriber substation then returns to the permanent positively polarized condition. However, message transmission may still be reinitiated.

During the typing operation described, the associated connected subscriber station receives and demodulates the pulse-coded message transmitted by the transmitting subscriber station. The received signals control supervisory device PU to cause generator G to transmit the upper control signal carrier frequency Sku. This is received at the typing subscriber station, and provides an indication that the connection between subscriber stations is completed.

It is also possible for the pulse-coded message receiving station to simultaneously teletype information back to the pulse-coded message transmitting station. For example, if station A is the typing-transmitting station, and station B is the receiving station, the transmitter in receiving station B transmits the upper control signal carrier frequency SKu to station A. Therefore, it is possible to transmit teletype information within the frequency range associated with the control signals because the teletype input is connected to generator G over line c1 in station B, and the teletype apparatus associated with station A is connected to the receiver thereof, over its connection line c2. Stations A and B are, of course, connected over long distance lines F1. However, there are limits to the information that may be transmitted over the described control signal channel because it is only approximately 50 cps. wide and, therefore, station B cannot type back faster than approximately 50 Bd.

Also it is noted that other subscriber stations may simultaneously be connected between the common telephone line for transmission of pulse-coded messages therebetween; these, of course, would employ different carrier frequencies for such transmission. The number of such individual connections would be determined by the pulse-coded message transmission range.

The clear key ST is utilized to break an existing connection between associated subscriber stations. By activating clear key ST a negative polarity signal of approximately 1 second time duration is transmitted to connection line c1. Time element t— therefore produces a binary 0 output, and AND gate G1 therefor controls transfer logic circuit U to effect disconnection of the established transmission path. Also, a portion of the applied negative polarity signal transmitted (before the transmitter is disconnected) and is received at the receiving connected subscriber station.

The output of receiver E of the receiving station is connected to connection line c2. In the event a received negative polarity signal is of a time duration longer than 300 ms., an electronic circuit (not shown) will maintain said negative polarity signal until a new connection is made, and the corresponding signal indicative thereof is received. The new connection can be effected by reception of either a pulse-coded message or a control signal.

In any event, the negative polarity signal produced by activation of the clear key ST, functions to disconnect the motor of the teletype machine at the receiving station through long distance switching apparatus Fg and further produces a permanent negative signal current to line c1 to block gate G1.

However, before gate G1 is blocked, a portion of the permanent negative signal is transmitted to the station that initially activated the clear key. That station's teletype motor is thus similarly deactivated because a negative polarity pulse greater than 300 ms. in time duration is produced at connection line c2 thereof. Also, its connection line c1 is fed with a permanent negative signal current and hence its AND gate G1 is blocked and the long distance line F1 no longer transmits signals.

The described apparatus also provides supervisory control of the teletype operation. For example, if information is being transmitted in the pulse-coded message channel, NK, of a subscriber station, but no transmitted signal is being received in the control signal channel, SK, thereof, it is probable that a telephone transmission line break has occurred. If under such conditions there is no received control signal, an appropriate electronic network may be used to evaluate this condition and produce a permanent negative signal that may be fed to connection line c2. This, of course, will deactivate the teletype machine. For example, logic supervisory device LU may be used to indicate whether or not a signal is being received by receiver E. When it produces a negative output signal (a binary 0) this will be indicative of the fact that a signal is not being received by receiver E. It may thus provide a permanent negative signal at connection line c2, and thereby initiate deactivation of the teletype machines associated with the connected subscriber stations as explained herebefore. Of course, indication of the fact that a signal is not being received by receiver E, may also be provided by other apparatus, such as acoustic or visual apparatus.

It is to be understood that the present invention is not limited to the above-described illustrative embodiment thereof. For example, it is possible that in the rest condition, the receiver may be connected to receive the control signal, and through a control command, may then be connected to receive the pulse-coded message.

Further, the modulation apparatus described may be used with other frequency ranges for transmission of the pulse-coded messages and control signals. For example, the pulse-coded messages may be transmitted in the frequency range of 50 to 300 c.p.s. and the control signals may be transmitted in the range immediately above this. Alternatively, the pulse-coded messages may be transmitted in the frequency range above 2,500 c.p.s. and the control signals may be transmitted in a frequency range immediately below 2,500 cps.

We claim:

1. Apparatus for selectively transmitting and receiving pulse modulated information and control signals in a predetermined frequency range (T/D) between subscriber stations (TS) connected to the opposite terminals of a voice telephone communication line (F1), each subscriber station having telephone equipment associated therewith (Tfr), wherein each subscriber station comprises;

filter means (W) connected between the voice telephone communication line and the telephone equipment (Tfr), to block signals in said predetermined frequency range, and between the voice telephone communication line and the subscriber station to block signals outside said predetermined frequency range, transmitter means (G) to selectively produce pulse modulated information or control signals, said transmitter means including means for producing control signals for controlling the operation of a receiving station to which said control signals are transmitted, receiver means (E) to receive pulse modulated information signals or control signals and to derive demodulated information and control signals therefrom, transfer means (UE,U) connected to said transmitter means and said receiver means to selectively connect said transmitter means and said receiver means to said telephone communication line through said filter means, said transfer means being operative in response to receipt of a one of said control signals, a first portion of said predetermined frequency range (T/D) comprising the pulse modulated information frequency range facilitating information transmission in either direction, and a second portion of said predetermined frequency range comprising the control signal frequency range, said first portion being larger than said second portion.

2. Apparatus as recited in claim 1 wherein said predetermined frequency range (T/D) comprises frequencies between 1,000 and 1,500 cps.

3. Apparatus as recited in claim 2 further comprising:

control means (Fs, Fg) connected to said transmitter means to selectively produce pulse modulated information and control signals having first (NKuSKu) or second (NK1,SK1) carrier frequencies, said transmitter being selectively settable to operate in said first portion of said predetermined frequency range or said second portion of said predetermined frequency range, said receiver being selectively settable on said first portion of said predetermined frequency range or said second portion of said predetermined frequency range.

4. Apparatus as recited in claim 3 further comprising:

a first channel (NaF) comprising band pass filter means to pass signals in said first portion of said predetermined frequency range, a second channel (SKF) comprising band pass filter means to pass signals in said second portion of said predetermined frequency range, logic apparatus (G1) connected to said control means and said transfer means to effect selective operation of said transfer means (U) to connect said receiver means (E) and said transmitter means (G) through said first and second channels respectively, or said second and first channels, respectively, to the telephone communication line, in response to the input signals from said control means to said transmitter.

5. Apparatus as recited in claim 4 having a rest condition in which the transmitter (G) of each subscriber station transmits a signal of characteristic frequency within the first portion of said predetermined frequency range and is connected through the second channel to the voice telephone communication line, and the receiver may receive and demodulate signals in the first portion of said predetermined frequency range.

6. Apparatus as recited in claim 5 wherein the control means (F*s*, F*g*) comprise a call key (AT), activation of said call key causing said logic apparatus (G1) to enable said transfer means (U) to effect connection of said transmitter (G) through said first channel (N*a*F) to said telephone communication line (F1), and to effect connection of said receiver through said second channel (SKF) to said telephone communication line (F1).

7. Apparatus as recited in claim 6 wherein said receiver comprises a supervisory device (PU) connected to said receiver means (E) and said transmitter means (G) responsive to signals received by said receiver means (E) upon activation of the call key of a connected subscriber station, to control the transmitter means (G) to transmit signals in the second portion of the predetermined frequency range.